United States Patent
Buckley et al.

(10) Patent No.: US 12,476,005 B2
(45) Date of Patent: Nov. 18, 2025

(54) MACHINE LEARNING TECHNIQUES FOR GENERATING HISTORICALLY DYNAMIC EXPLANATION DATA OBJECTS

(71) Applicant: Optum, Inc., Minnetonka, MN (US)

(72) Inventors: Gregory Buckley, Dublin (IE); David S. Monaghan, Dublin (IE); Johnathon E. Schultz, Cross Hill, SC (US); Ajay Ajit Maity, Donegal (IE)

(73) Assignee: Optum, Inc., Minnetonka, MN (US)

( * ) Notice: Subject to any disclaimer, the term of this patent is extended or adjusted under 35 U.S.C. 154(b) by 950 days.

(21) Appl. No.: 17/483,319

(22) Filed: Sep. 23, 2021

(65) Prior Publication Data

US 2023/0090591 A1  Mar. 23, 2023

(51) Int. Cl.
*G16H 50/20* (2018.01)
*G06N 5/02* (2023.01)
*G16H 30/20* (2018.01)

(52) U.S. Cl.
CPC .......... *G16H 50/20* (2018.01); *G06N 5/027* (2013.01); *G16H 30/20* (2018.01)

(58) Field of Classification Search
CPC ........ G16H 50/20; G16H 30/20; G16H 30/40; G16H 50/70; G06N 5/027; G06N 3/042; G06N 3/044; G06N 5/041; G06N 3/0455; G06N 3/0464; G06T 7/0016;

(Continued)

(56) References Cited

U.S. PATENT DOCUMENTS

| 10,572,625 | B2 | 2/2020 | Golay |
| 10,916,053 | B1* | 2/2021 | Katzman .................. G06T 7/50 |
| 2017/0011190 | A1 | 1/2017 | Joao |

(Continued)

FOREIGN PATENT DOCUMENTS

| WO | 2019/222135 A1 | 11/2019 |
| WO | 2020/136573 A1 | 7/2020 |

OTHER PUBLICATIONS

"AI For Dental X-Ray Imaging and Voice Charting, " Denti.AI, (article, online), (5 pages), [Retrieved from the Internet Jan. 31, 2022] URL: https://www.denti.ai/.

(Continued)

*Primary Examiner* — Kambiz Abdi
*Assistant Examiner* — Tran N Nguyen
(74) *Attorney, Agent, or Firm* — Alston & Bird LLP

(57) ABSTRACT

Various embodiments of the present invention provide methods, apparatus, systems, computing devices, computing entities, and/or the like for generating a historically dynamic explanation data object for a dental image data object. Certain embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model.

20 Claims, 10 Drawing Sheets

(58) Field of Classification Search
CPC . G06T 2207/10116; G06T 2207/20081; G06T 2207/20084; G06T 2207/30036
USPC ........................................................ 705/2–3
See application file for complete search history.

(56) References Cited

U.S. PATENT DOCUMENTS

| | | | | |
|---|---|---|---|---|
| 2018/0184989 | A1* | 7/2018 | Inglese | A61C 7/002 |
| 2019/0313963 | A1 | 10/2019 | Hillen | |
| 2020/0015764 | A1 | 1/2020 | Brooks et al. | |
| 2020/0100724 | A1 | 4/2020 | Golay | |
| 2020/0146646 | A1 | 5/2020 | Tuzoff et al. | |
| 2020/0306011 | A1* | 10/2020 | Chekhonin | G16H 30/40 |
| 2020/0360109 | A1* | 11/2020 | Gao | A61B 34/10 |
| 2020/0364860 | A1* | 11/2020 | Kearney | G16H 30/40 |
| 2020/0411167 | A1 | 12/2020 | Kearney et al. | |
| 2020/0411201 | A1* | 12/2020 | Kearney | G06N 3/047 |
| 2021/0059796 | A1* | 3/2021 | Weiss | A61C 9/0053 |
| 2021/0118129 | A1 | 4/2021 | Kearney et al. | |
| 2021/0353393 | A1* | 11/2021 | Kearney | G16H 50/30 |

OTHER PUBLICATIONS

"Improving The Quality of Dental Care With The Power of AI," Oraca Dental AI, (article, online), [Retrieved from the Internet Jan. 31, 2022] URL: https://www.orca-ai.com/.

Allaouzi, Imane et al. "Automatic Caption Generation For Medical Images," SCA '18: Proceedings of the 3rd International Conference On Smart City Applications, Oct. 10, 2018, pp. 1-6, Available online: https://doi.org/10.1145/3286606.3286863.

Jing, Baoyu et al. "On The Automatic Generation Of Medical Imaging Reports," arXiv Preprint arXiv: 1711.08195v3 [cs.CL] Jul. 20, 2018, (10 pages).

Kougia, Vasiliki et al. "A Survey On Biomedical Image Captioning," arXiv Preprint arXiv: 1905.13302v1 [cs.CV] May 26, 2019, (11 pages).

Silva, Gil et al. Automatic Segmenting Teeth In X-Ray Images: Trends, A Novel Data Set, Benchmarking and Future Perspectives, arXiv Preprint arXiv: 1802.03086v1 [cs.CV] Feb. 9, 2018, (33 pages).

* cited by examiner

MACHINE LEARNING TECHNIQUES FOR GENERATING HISTORICALLY DYNAMIC EXPLANATION DATA OBJECTS

BACKGROUND

Various embodiments of the present invention address technical challenges related to performing predictive data analysis and provide solutions to address the efficiency and reliability shortcomings of various existing predictive data analysis solutions.

BRIEF SUMMARY

In general, various embodiments of the present invention provide methods, apparatus, systems, computing devices, computing entities, and/or the like for generating a historically dynamic explanation data object for a dental image data object. Certain embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model.

In accordance with one aspect, a method is provided. In one embodiment, the method comprises: determining, based at least in part on a dental image data object and one or more tooth-specific bounding box sub-images of the dental image data object and by using a current diagnosis identification machine learning model, a current diagnosis code vector for the dental image data object; determining, based at least in part on historical data associated with an individual identifier and by using a historical diagnosis identification machine learning model, a historical diagnosis code vector for the dental image data object; determining, based at least in part on the current diagnosis code vector and the historical diagnosis code vector, a new diagnosis code vector for the dental image data object; determine, based at least in part on the new diagnosis vector for the dental image data object, a dental image embedding for the dental image data object; determining, based at least in part on the dental image embedding and by using a decoder machine learning framework, the historically dynamic explanation data object, wherein the decoder machine learning framework is trained in combination with an encoder machine learning framework that comprises the current diagnosis identification machine learning model and the historical diagnosis identification machine learning model; and performing one or more prediction-based cations based at least in part on the historically dynamic explanation data object.

In accordance with another aspect, a computer program product is provided. The computer program product may comprise at least one computer-readable storage medium having computer-readable program code portions stored therein, the computer-readable program code portions comprising executable portions configured to: determine, based at least in part on a dental image data object and one or more tooth-specific bounding box sub-images of the dental image data object and by using a current diagnosis identification machine learning model, a current diagnosis code vector for the dental image data object; determine, based at least in part on historical data associated with an individual identifier and by using a historical diagnosis identification machine learning model, a historical diagnosis code vector for the dental image data object; determine, based at least in part on the current diagnosis code vector and the historical diagnosis code vector, a new diagnosis code vector for the dental image data object; determine, based at least in part on the new diagnosis vector for the dental image data object, a dental image embedding for the dental image data object; determine, based at least in part on the dental image embedding and by using a decoder machine learning framework, the historically dynamic explanation data object, wherein the decoder machine learning framework is trained in combination with an encoder machine learning framework that comprises the current diagnosis identification machine learning model and the historical diagnosis identification machine learning model; and perform one or more prediction-based cations based at least in part on the historically dynamic explanation data object.

In accordance with yet another aspect, an apparatus comprising at least one processor and at least one memory including computer program code is provided. In one embodiment, the at least one memory and the computer program code may be configured to, with the processor, cause the apparatus to: determine, based at least in part on a dental image data object and one or more tooth-specific bounding box sub-images of the dental image data object and by using a current diagnosis identification machine learning model, a current diagnosis code vector for the dental image data object; determine, based at least in part on historical data associated with an individual identifier and by using a historical diagnosis identification machine learning model, a historical diagnosis code vector for the dental image data object; determine, based at least in part on the current diagnosis code vector and the historical diagnosis code vector, a new diagnosis code vector for the dental image data object; determine, based at least in part on the new diagnosis vector for the dental image data object, a dental image embedding for the dental image data object; determine, based at least in part on the dental image embedding and by using a decoder machine learning framework, the historically dynamic explanation data object, wherein the decoder machine learning framework is trained in combination with an encoder machine learning framework that comprises the current diagnosis identification machine learning model and the historical diagnosis identification machine learning model; and perform one or more prediction-based cations based at least in part on the historically dynamic explanation data object.

BRIEF DESCRIPTION OF THE DRAWINGS

Figure 1:
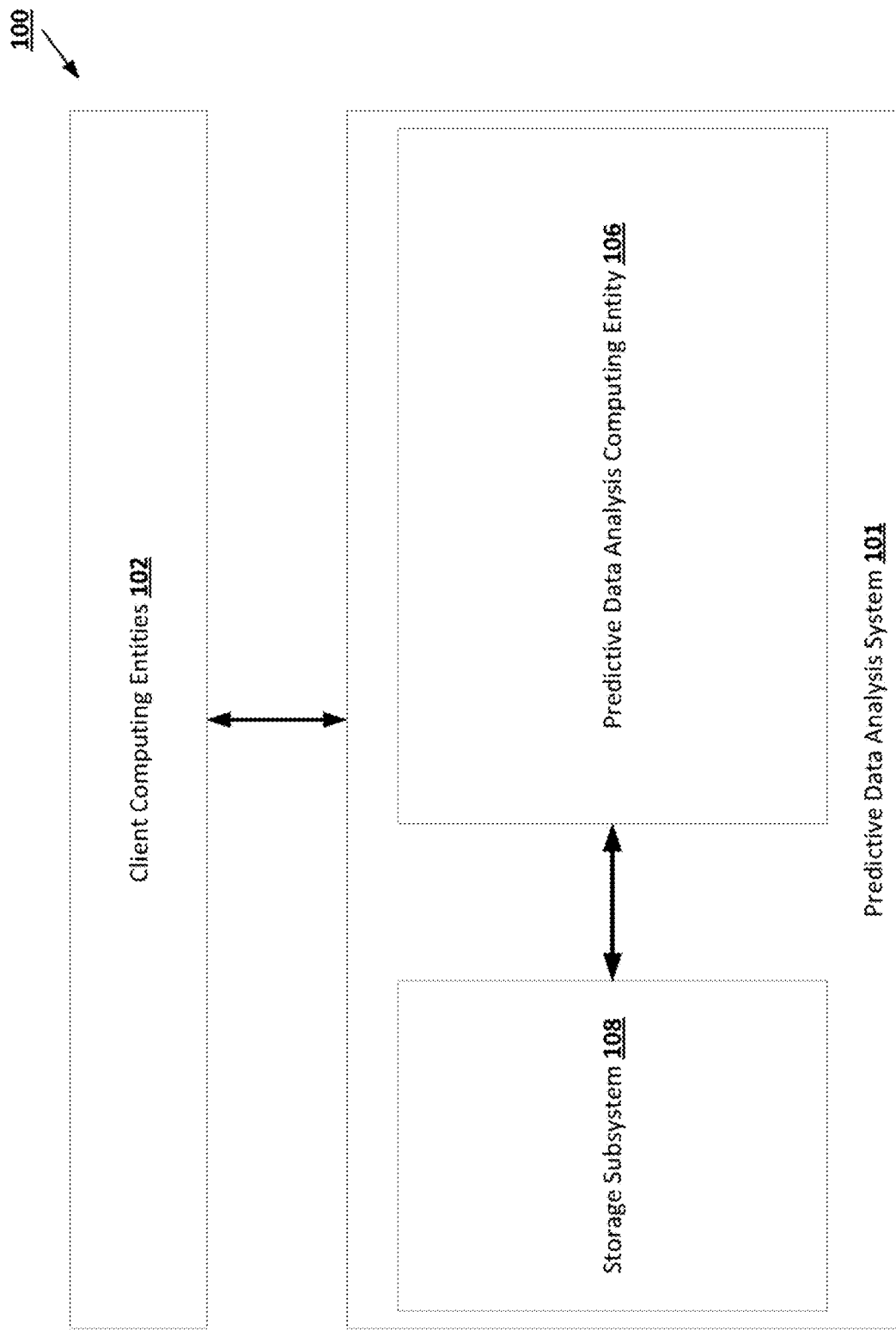

Having thus described the invention in general terms, reference will now be made to the accompanying drawings, which are not necessarily drawn to scale, and wherein:

FIG. 1 provides an exemplary overview of an architecture that can be used to practice embodiments of the present invention.

Figure 2:
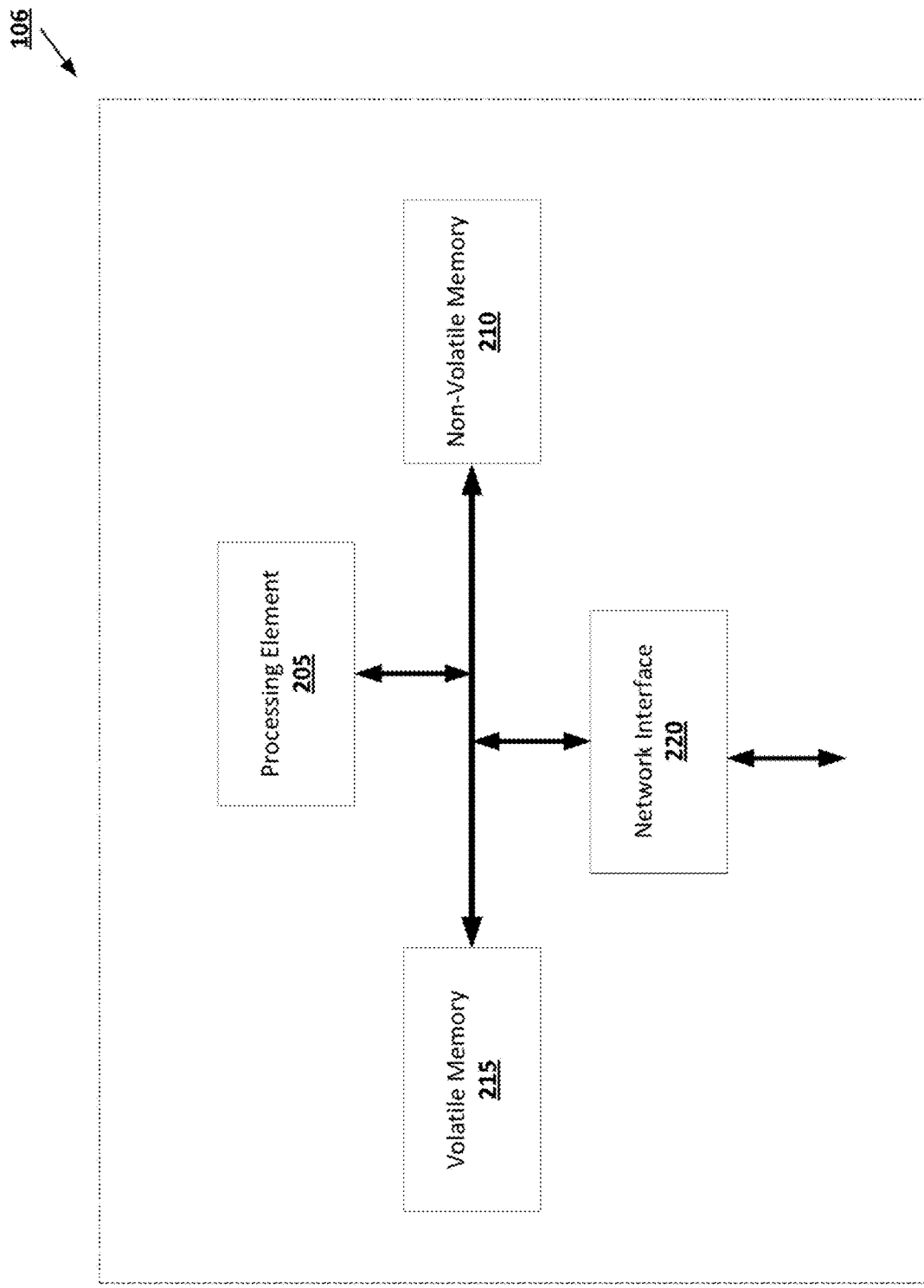

FIG. 2 provides an example predictive data analysis computing entity in accordance with some embodiments discussed herein.

Figure 3:
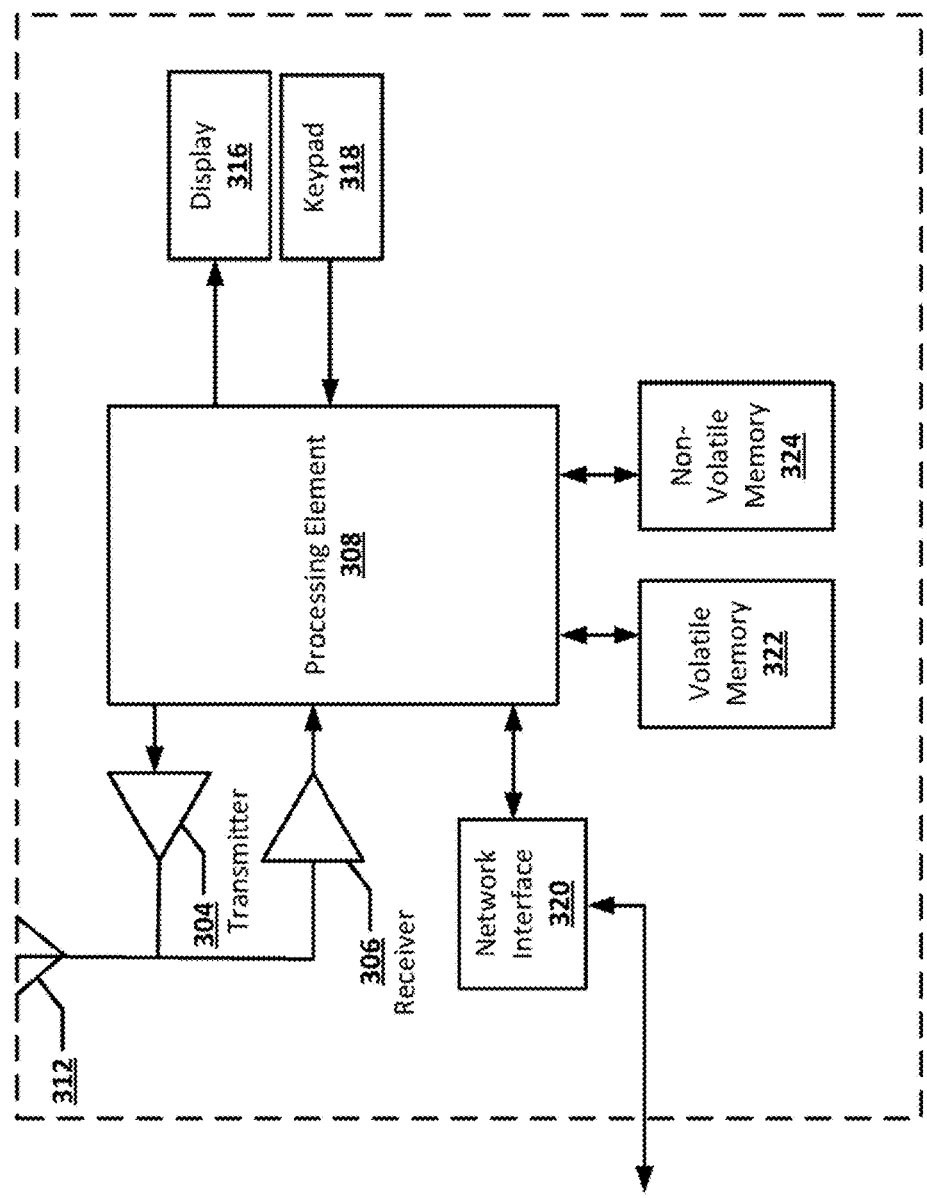

FIG. 3 provides an example client computing entity in accordance with some embodiments discussed herein.

Figure 4:
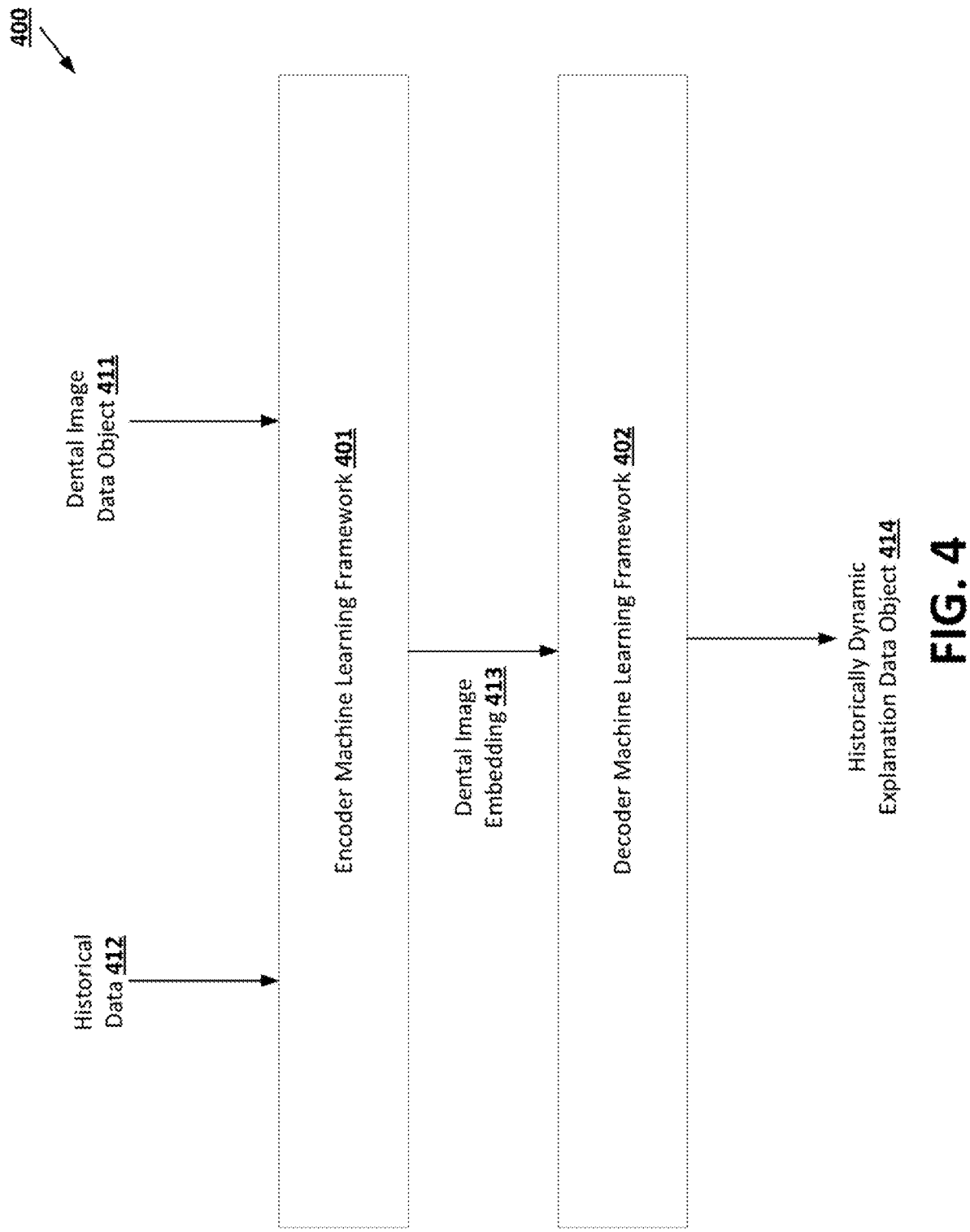

FIG. 4 is a flowchart diagram of an example process for generating a historically dynamic explanation data object for a dental image data object that is associated with an individual identifier in accordance with some embodiments discussed herein.

Figure 5:
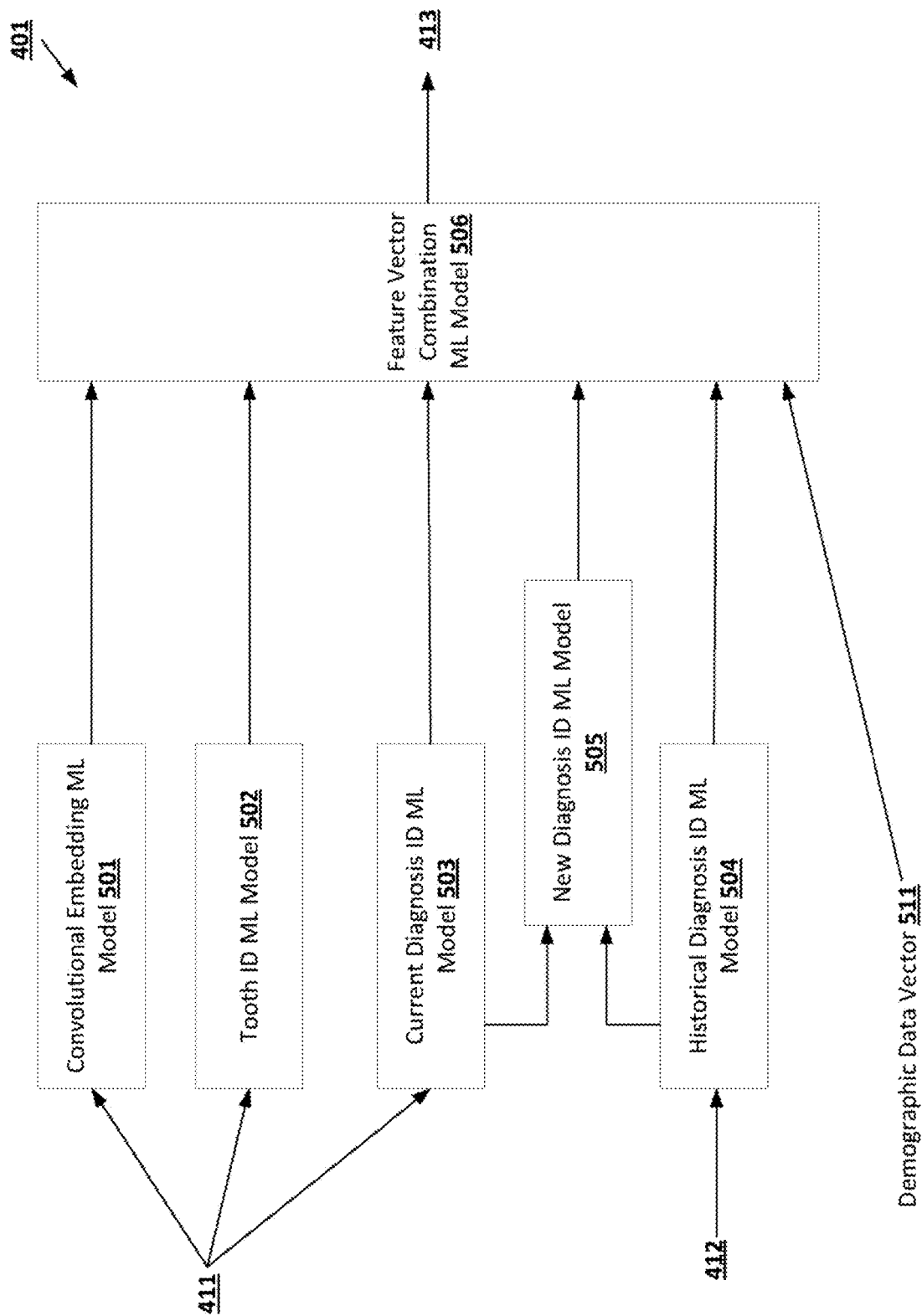

FIG. 5 provides an operational example of an encoder machine learning framework in accordance with some embodiments discussed herein.

Figure 6:
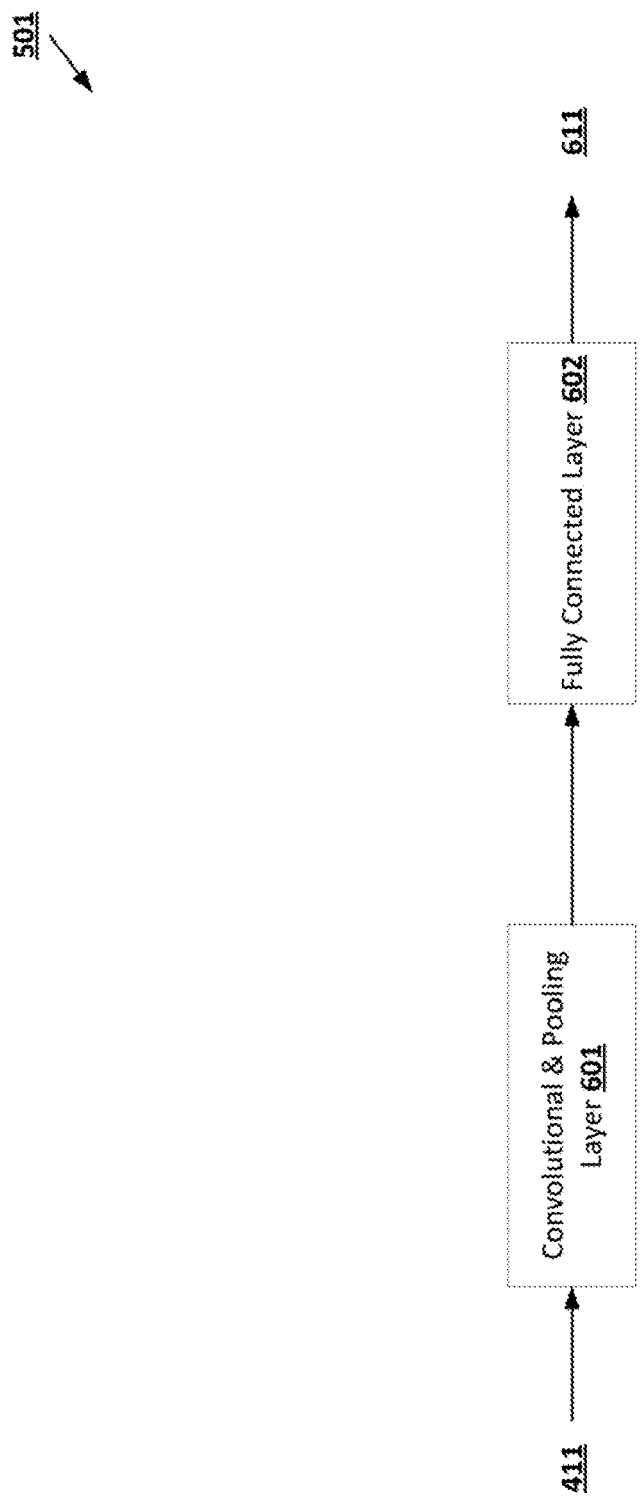

FIG. 6 provides an operational example of a convolutional embedding machine learning model in accordance with some embodiments discussed herein.

Figure 7:
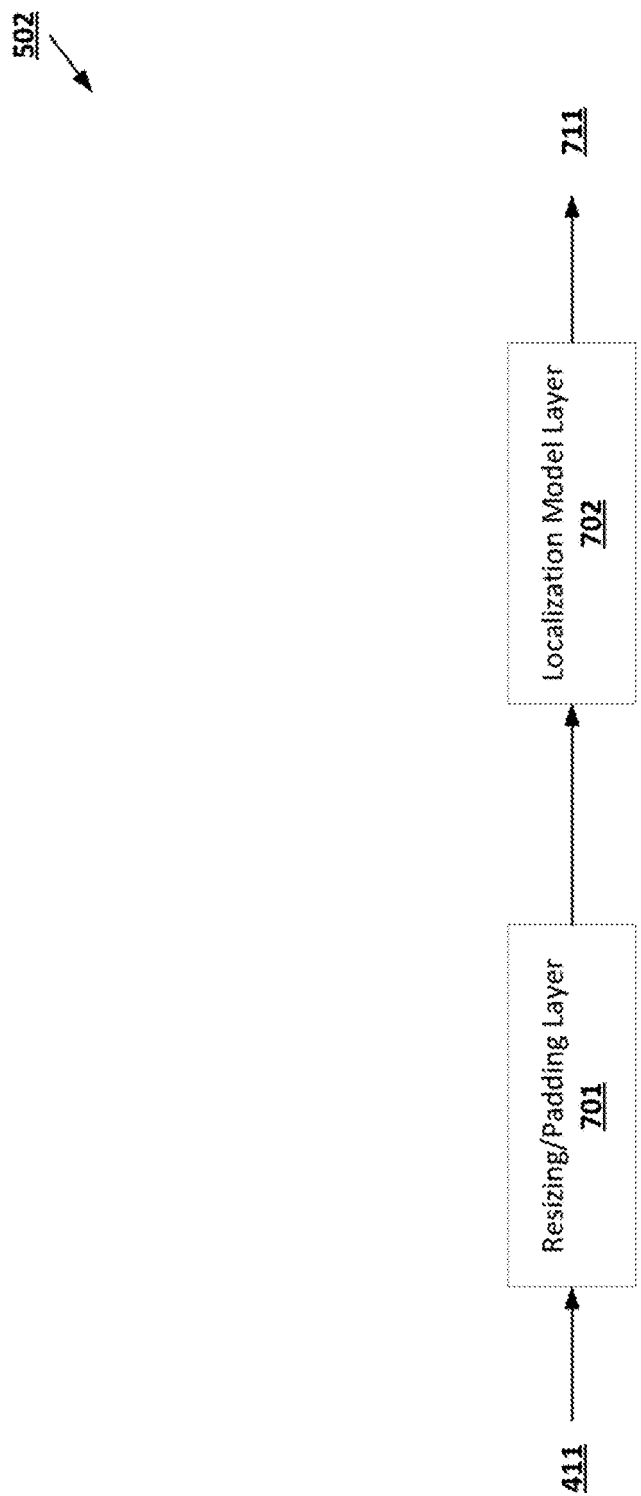

FIG. 7 provides an operational example of a tooth identification embedding machine learning model in accordance with some embodiments discussed herein.

Figure 8:
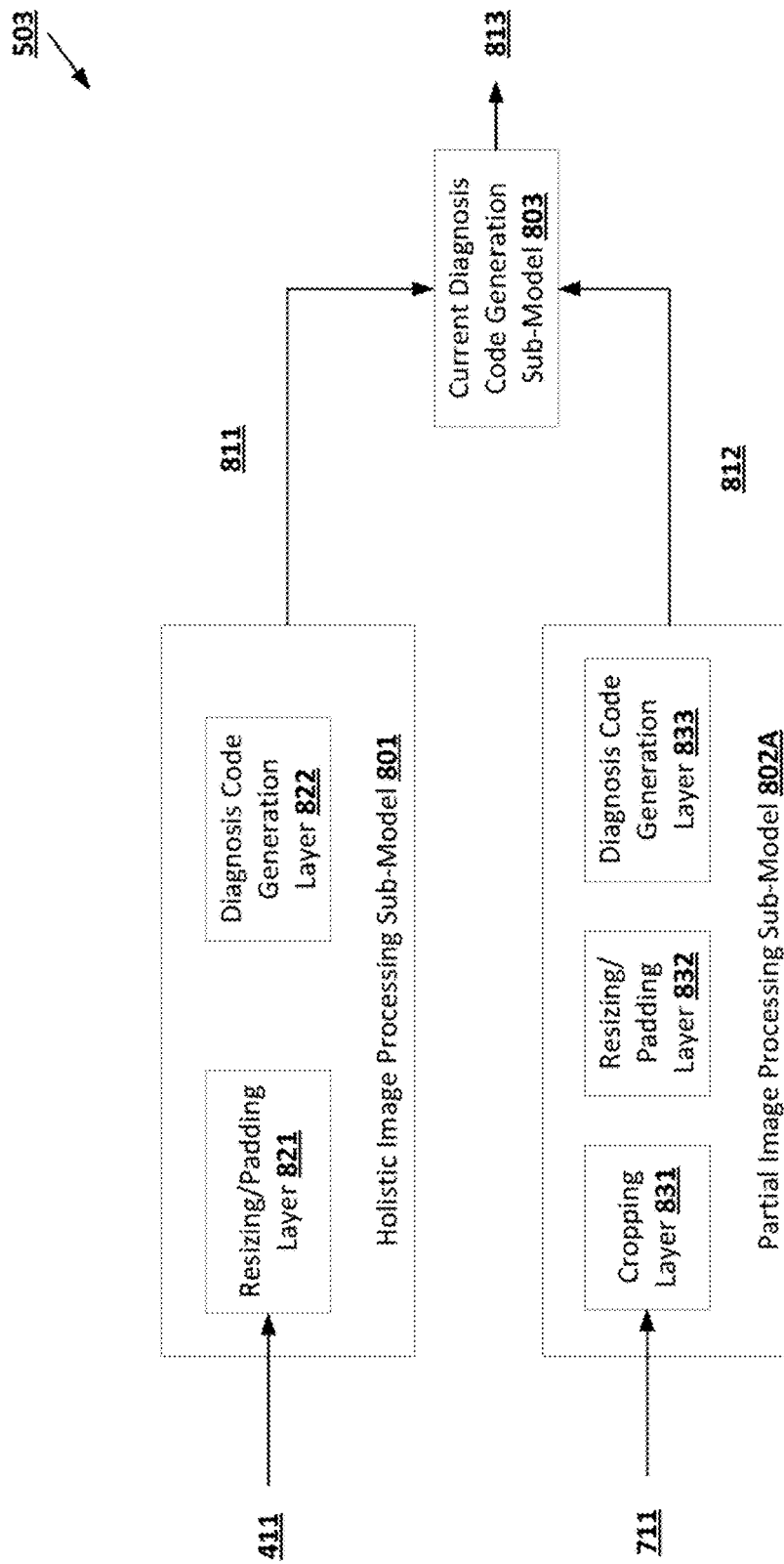

FIG. 8 provides an operational example of a current diagnosis code identification machine learning model in accordance with some embodiments discussed herein.

Figure 9:
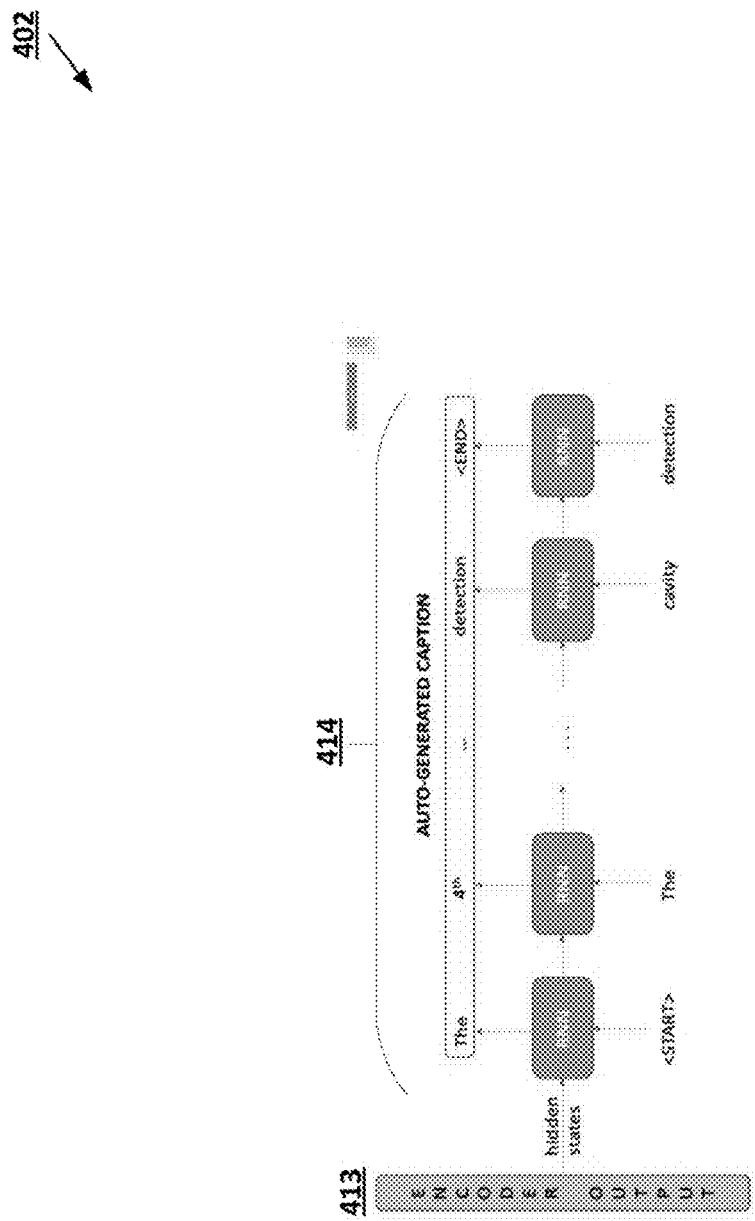

FIG. 9 provides an operational example of a decoder machine learning framework in accordance with some embodiments discussed herein.

Figure 10:
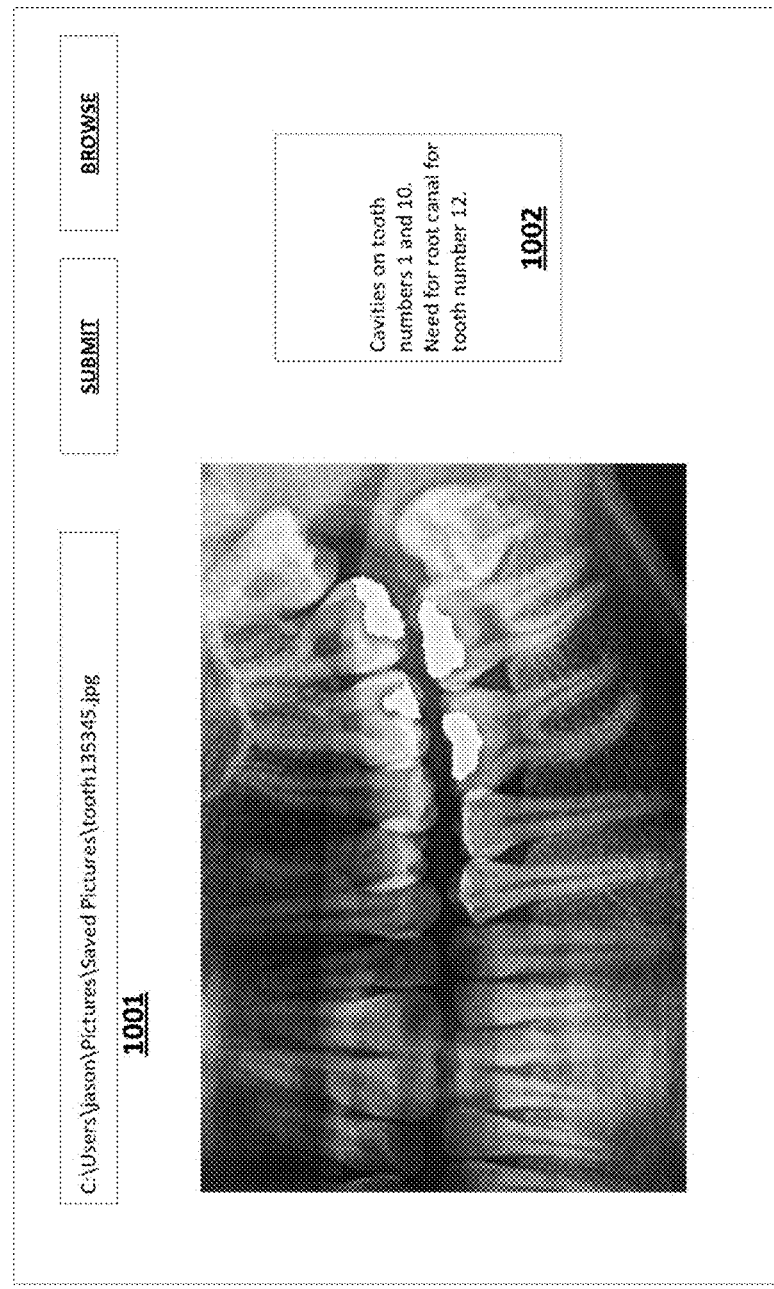

FIG. 10 provides an operational example of a prediction output user interface that describes a historically dynamic explanation data object for a dental image data object in accordance with some embodiments discussed herein.

DETAILED DESCRIPTION

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to predictive data analysis, one of ordinary skill in the art will recognize that the disclosed concepts can be used to perform other types of data analysis.

I. OVERVIEW AND TECHNICAL IMPROVEMENTS

Various embodiments of the present invention improve the efficiency and reliability of performing generating explanatory data for dental image data objects based at least in part on historical data associated with individual identifiers associated with the noted dental image data objects. For example, various embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model. By using the noted techniques, various embodiments of the present invention enable automated captioning of dental image data objects, a feature that reduces the need for using dental image maintenance systems to generate manual captions for dental image data objects. In this way, various embodiments of the present invention improve efficiency of and reduce the overall operational load on dental image maintenance systems.

An exemplary application of various embodiments of the present invention relates to generating captions for x-ray images, including automatically generating a diagnosis caption for a dental X-ray image of a patient based at least in part on diagnosis codes derived from the dental X-ray image and an electronic health record of the patient. Aspects of various embodiments of the present invention generate the diagnosis caption at a word level in a sequential manner. A key benefit of these concepts is the automatic captioning of dental x-ray images, thereby reducing time and expenses spent manually captioning such images (as done in current methods by clinical professionals). These techniques are also advantageous in being flexible in implementation, where individual subsystems that perform individual operations or functions may be interchangeable with other subsystems. For example, a subsystem configured to determine Current Dental Terminology (CDT) diagnosis codes may be replaced with another subsystem configured to determine International Classification of Diseases (ICD) diagnosis codes.

According to some aspects of various embodiments of the present invention, the following operations are performed: receiving a dental x-ray image of a patient and an electronic health record (EHR) of the patient; determining a plurality of image-derived diagnosis codes based at least in part on the dental x-ray image, each image-derived diagnosis code being a macro-level image-derived diagnosis code or a micro-level image-derived diagnosis code; determining a plurality of record-derived diagnosis codes based at least in part on the EHR of the patient, each record-derived diagnosis code associated with a weight value; generating a feature vector including the plurality of image-derived diagnosis codes and the plurality of record-derived diagnosis codes; and automatically generating a text-based caption in a sequential manner based at least in part on the feature vector.

II. DEFINITIONS

The term "dental image data object" may refer to a data entity that is configured to describe an image that depicts at least one tooth associated with a particular individual, where an individual identifier of the particular individual that uniquely identifies the particular individual is associated with the dental image data object. In some embodiments, the dental image data object describes an x-ray image of the interior of an individual's mouth. In some embodiments, the dental image data object may comprise a set of bounding tooth-specific box sub-images each corresponding to a defined region of the dental image data object, where each bounding tooth-specific box sub-image depicts a tooth whose image is captured by the dental image data object. In some embodiments, prior to being processed by an encoder machine learning framework, the dental image data object is preprocessed in accordance with one or more defined preprocessing operations (e.g., the dental image data object is resized to a default size and/or padded).

The term "historical data" may refer to a data entity that is configured to describe a diagnostic history of the individual identifier and/or a demographic profile of the individual identifier. In some embodiments, the historical data include a structured subset (e.g., structured electronic health record (EHR) data) that describe one or more diagnosis codes of the individual identifier in a structured way. In some embodiments, the historical data include an unstructured subset (e.g., unstructured electronic health record (EHR) data including medical notes data) that describe diagnostic history of the individual identifier in an unstructured way. In some embodiments, the structured subset of the historical data can be used to generate one or more structured diagnosis codes for the individual identifier. In some embodiments, the unstructured subset of the historical data can be used to generate one or more unstructured diagnosis codes for the individual identifier.

The term "dental image embedding" may refer to a data entity that is configured to describe a fixed-size representation of a dental image data object and the historical data associated with an individual identifier of the dental image data object, where the dental image embedding may be generated by an encoder machine learning framework. In some embodiments, determining the dental image embedding comprises: determining, based at least in part on the dental image data object and one or more tooth-specific bounding box sub-images of the dental image data object and by using a current diagnosis identification machine learning model, a current diagnosis code vector for the dental image data object; determining, based at least in part on historical data associated with the individual identifier and by using a historical diagnosis identification machine learning model, a historical diagnosis code vector for the dental image data object; determining, based at least in part on the current diagnosis code vector and the historical diagnosis code vector, a new diagnosis code vector for the dental image data object; and determining, based at least in part on the new diagnosis vector for the dental image data object, a dental image embedding for the dental image data object.

The term "encoder machine learning framework" may refer to a data entity that is configured to describe parameters, hyper-parameters, and/or defined operations of a set of one or more data processing routines that are configured to process a dental image data object and historical data associated with an individual Identifier for the dental image data object to generate a dental image embedding for the dental image data object. In some embodiments, the encoder machine learning framework comprises: (i) a convolutional embedding machine learning model that is configured to process the dental image data object to generate a convolutional embedding vector for the dental image data object, (ii) a tooth identification embedding machine learning model that is configured to process the dental image data object to identify one or more tooth-specific bounding box sub-images in the dental image data object as well as a tooth type identifier for each tooth-specific bounding box sub-image, (iii) a current diagnosis machine learning model that is configured to process the dental image data object and each tooth type identifier for a tooth-specific bounding box sub-image of the dental image data object to generate a current diagnosis code vector for the dental image data object, (iv) a historical diagnosis code identification machine learning model that is configured to process the historical data to generate a historical diagnosis vector for the dental image data object, (v) a new diagnosis code identification machine learning model that is configured to process the current diagnosis code vector and the historical diagnosis code vector to generate a new diagnosis code vector for the dental image data object, and (vi) a feature vector combination machine learning model that is configured to generate the dental image embedding for the dental image data object based at least in part on the convolutional embedding vector, the tooth identification vector, the current diagnosis code vector, the historical diagnosis code vector, the new diagnosis code vector, and a demographic data vector for the individual identifier.

The term "decoder machine learning framework" may refer to a data entity that is configured to describe parameters, hyper-parameters, and/or defined operations of a set of one or more data processing routines that are configured to process a dental image embedding for a dental data object to generate a historically dynamic explanation data object for the dental image data object. In some embodiments, the decoder machine learning framework comprises a recurrent neural network machine learning model, for example a recurrent neural network machine learning model that is configured to process a segment (e.g., a single value) of the dental image embedding at each time step and that is configured to generate the historically dynamic explanation data object based at least in part on each timestep output for each time step of the recurrent neural network machine learning model. In some embodiments, the decoder machine learning framework is trained in combination with the encoder machine learning framework. For example, in some embodiments, during each training iteration: (i) an input dental image data object for a particular individual identifier and historical data for the particular individual identifier are provided as an input to the encoder machine learning framework in order to generate a particular dental image embedding for the input dental image data object, (ii) the particular dental image embedding is processed by the decoder machine learning framework to generate an inferred historically dynamic explanation data object for the input dental image data object, and (iii) trainable parameters of the encoder machine learning framework and trainable parameters of the decoder machine learning framework are updated in a manner that is configured to (e.g., locally or globally) optimize a measure of deviation of the inferred historically dynamic explanation data object and a ground-truth historically dynamic explanation data object for the input dental image data object. As another example, in some embodiments, during a set of training iterations: (i) a set of input dental image data objects for a set of individual identifiers and historical data for the set of individual identifiers are provided as inputs to the encoder machine learning framework in order to generate a set of dental image embeddings for the input dental image data objects, (ii) the particular dental image embeddings are processed by the decoder machine learning framework to generate a set of inferred historically dynamic explanation data objects for the input dental image data objects, and (iii) trainable parameters of the encoder machine learning framework and trainable parameters of the decoder machine learning framework are updated in a manner that is configured to (e.g., locally or globally) optimize a measure of deviation of the inferred historically dynamic explanation data objects and ground-truth historically dynamic explanation data objects for the input dental image data objects.

The term "convolutional embedding machine learning model" may refer to a data entity that is configured to describe parameters, hyper-parameters, and/or defined operations of a model that is configured to process a dental image data object using a set of convolutional operations in order to generate a convolutional embedding vector for the dental image data object. In some embodiments, the convolutional embedding machine learning model is configured to: (i) process the dental image data object using a set of convolutional and pooling operations (e.g., using any convolutional neural network feature extractor) to generate a final convolutional feature map, and (ii) performing one or more flattening operations on the final convolutional feature map to generate the convolutional embedding vector. In some embodiments, the inputs to a convolutional embedding machine learning model comprise a matrix describing a dental image data object. In some embodiments, outputs of a convolutional embedding machine learning model comprise the convolutional embedding vector.

The term "tooth identification embedding machine learning model" may refer to a data entity that is configured to describe parameters, hyper-parameters, and/or defined operations of a model that is configured to process a dental image data object in order to generate a tooth identification vector that describes one or more tooth-specific bounding box sub-images of the dental image data object. In some embodiments, the tooth identification vector describes, for each tooth-specific bounding box sub-image of the dental image data object, a tooth type identifier for the tooth-specific bounding box sub-image. In some embodiments, the tooth identification embedding machine learning model is configured to: (i) process the dental image data object using a set of resizing and padding operations to generate a resized dental image data object, and (ii) process the resized dental image data object using a set of image localization operations to generate a tooth identification vector. In some embodiments, the tooth identification embedding machine learning model is trained using training data describing, for each training dental image data object, a set of ground-truth tooth-specific bounding box sub-images and a ground-truth tooth type identifier for each ground-truth tooth-specific bounding box sub-image. In some embodiments, the inputs to a tooth identification embedding machine learning model comprise a matrix describing a dental image data object. In some embodiments, outputs of a tooth identification embedding machine learning model comprise the tooth identification vector. In some embodiments, the tooth identification vector is provided as an input to the current diagnosis code identification machine learning model.

The term "current diagnosis code identification machine learning model" may refer to a data entity that is configured to describe parameters, hyper-parameters, and/or defined operations of a model that is configured to process a dental image data object in order to generate a current diagnosis code vector a set of inferred diagnosis codes determined based at least in part on the dental image data object and/or based at least in part on tooth-specific bounding box sub-images of the dental image data object. In some embodiments, the current diagnosis code identification machine learning model comprises at least one of the following: (i) a holistic image processing sub-model of the current diagnosis identification machine learning model that is configured to process the dental image data object as a whole in order to generate a holistic current diagnosis code vector for the dental image data object that describes a set of inferred diagnosis codes that are determined based at least in part on the dental image data object as a whole; and (ii) a set of partial image processing sub-models of the current diagnosis identification machine learning model, where each partial image processing sub-model is configured to process a tooth-specific bounding box sub-image having a corresponding tooth type identifier that is associated with the tooth-specific bounding box sub-image in order to generate a tooth-specific current diagnosis code vector for the dental image data object with respect to the tooth-specific bounding box sub-image that describes a set of diagnosis codes that are inferred based at least in part on the noted tooth-specific current diagnosis code vector. In some of the noted embodiments, the current diagnosis code identification machine learning model is configured to combine (e.g., append, add up followed by removing duplicates, and/or the like) the holistic current diagnosis code vector and the set of tooth-specific current diagnosis code vectors generated by the set of partial image processing sub-models in order to generate the current diagnosis code vector. In some embodiments, the current diagnosis code vector is configured to describe a set of diagnosis code vectors for a dental image data object based at least in part on the dental image data object and/or based at least in part on tooth-specific bounding box sub-images of the dental image data object. In some embodiments, the inputs to the current diagnosis code identification machine learning model comprise at least one of the following: (i) a matrix describing a dental image data object, or (ii) for each tooth-specific bounding box sub-image, a vector describing location of the tooth-specific bounding box sub-image within the dental image data object and/or a tooth type identifier of the tooth-specific bounding box sub-image. In some embodiments, outputs of the current diagnosis code identification machine learning model comprise a vector describing the current diagnosis code vector. In some embodiments, each diagnosis code described by the current diagnosis code vector is associated with a confidence value describing a relative degree of confidence in applicability of the diagnosis code.

The term "historical diagnosis identification machine learning model" may refer to a data entity that is configured to describe parameters, hyper-parameters, and/or defined operations of a model that is configured to process historical data associated with an individual identifier that is associated with a dental image data object in order to generate a historical diagnosis code vector for the dental image data object that describes a set of diagnosis codes inferred based at least in part on the noted historical data. In some embodiments, the historical diagnosis code identification machine learning model comprises: (i) a structured data processing sub-model that is configured to extract a set of structured diagnosis codes for the individual identifier based at least in part on a structured subset of the historical data, and (ii) an unstructured data processing sub-model (e.g., a natural language processing machine learning model) that is configured to process an unstructured subset of the historical data to generate a set of unstructured diagnosis codes for the individual identifier. In some of the noted embodiments, the historical diagnosis code vector is generated based at least in part on at least one of the set of structured diagnosis codes and the set of unstructured diagnosis codes. In some embodiments, the unstructured data processing sub-model comprises a bidirectional text data encoder that uses a multi-headed attention machine mechanism and a classification model, where the bidirectional text data encoder is configured to generate a text embedding for the unstructured subset and the classification model is configured to extract the set of unstructured diagnosis codes based at least in part on the text embedding. In some embodiments, inputs to the historical diagnosis code identification machine learning model comprise vectors describing structured historical data and vectors describing unstructured historical data. In some embodiments, outputs of the historical diagnosis code identification machine learning model comprise a vector describing the historical diagnosis code vector. In some embodiments, each diagnosis code described by the historical diagnosis code vector is associated with a confidence value describing a relative degree of confidence in applicability of the diagnosis code.

The term "new diagnosis code identification machine learning model" may refer to a data entity that is configured to describe parameters, hyper-parameters, and/or defined operations of a model that is configured to process a current diagnosis code vector for a dental image data object that is associated with an individual identifier and a historical diagnosis code vector for the individual identifier in order to generate a new diagnosis code vector for the dental image data object, where the new diagnosis code vector may be configured to describe a set of diagnosis codes that are described by the dental image data object independent of the historical data associated with the individual identifier. In some embodiments, the new diagnosis code vector is determined based at least in part on an output of a subtraction operation performed across the current diagnosis code vector and the historical diagnosis code vector (e.g., by removing those diagnosis codes described by the historical diagnosis code vector from the current diagnosis code vector). In some embodiments, the new diagnosis code identification machine learning model is a machine learning model that is configured to process features extracted from the current diagnosis vector and features extracted from the historical diagnosis code vector using a set of trained parameters in order to generate the new diagnosis code vector. In some embodiments, inputs to the new diagnosis code identification machine learning model comprise two vectors, one corresponding to the current diagnosis code vector and one corresponding to the historical diagnosis code vector. In some embodiments, outputs of the new diagnosis code identification machine learning model comprise a vector corresponding to the new diagnosis code vector.

The term "feature vector combination machine learning model" may refer to a data entity that is configured to describe parameters, hyper-parameters, and/or defined operations of a model that is configured to generate a dental image embedding for a dental image data object associated with an individual identifier based at least in part on a set of input vectors associated with the dental image data object and/or with the individual identifier. In some embodiments, the set of input vectors comprise at least one (e.g., all) of the following vectors: a convolutional embedding vector for the dental image data object, a tooth identification vector for the dental image data object, a current diagnosis code vector for the dental image data object, a historical diagnosis code vector for the dental image data object, a new diagnosis code vector for the dental image data object, and a demographic data vector for the individual identifier (e.g., a demographic data vector describing one or more demographic features of the individual identifier, such as at least one of age of the individual identifier, gender of the individual identifier, location of the individual identifier, and/or the like). In some embodiments, the feature vector combination machine learning model is configured to append set of input vectors to generate the historically dynamic explanation data object. In some embodiments, the feature vector combination machine learning model is configured to perform a defined vector operation across the set of input vectors to generate the historically dynamic explanation data object. In some embodiments, the feature vector combination machine learning model is configured to process features extracted based at least in part on the set of input vectors in accordance with a set of trained parameters to generate the historically dynamic explanation data object. In some embodiments, inputs to the feature vector combination machine learning model comprise a set of vectors corresponding to the set of input vectors. In some embodiments, outputs of the feature vector combination machine learning model comprise a vector corresponding to the dental image embedding.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations. Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. EXEMPLARY SYSTEM ARCHITECTURE

FIG. 1 is a schematic diagram of an example architecture 100 for performing predictive data analysis. The architecture 100 includes a predictive data analysis system 101 configured to receive predictive data analysis requests from client computing entities 102, process the predictive data analysis requests to generate predictions, provide the generated predictions to the client computing entities 102, and automatically perform prediction-based actions based at least in part on the generated predictions. An example of a prediction-based action that can be performed using the predictive data analysis system 101 is generating a set of recommended health actions for an individual. Another example of a prediction-based action that can be performed using the predictive data analysis system 101 is generating an automated caption for a dental image corresponding to a dental image data object.

In some embodiments, predictive data analysis system 101 may communicate with at least one of the client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like).

The predictive data analysis system 101 may include a predictive data analysis computing entity 106 and a storage subsystem 108. The predictive data analysis computing entity 106 may be configured to receive predictive data analysis requests from one or more client computing entities 102, process the predictive data analysis requests to generate predictions corresponding to the predictive data analysis requests, provide the generated predictions to the client computing entities 102, and automatically perform prediction-based actions based at least in part on the generated predictions.

The storage subsystem 108 may be configured to store input data used by the predictive data analysis computing entity 106 to perform predictive data analysis as well as model definition data used by the predictive data analysis computing entity 106 to perform various predictive data analysis tasks. The storage subsystem 108 may include one or more storage units, such as multiple distributed storage units that are connected through a computer network. Each storage unit in the storage subsystem 108 may store at least one of one or more data assets and/or one or more data about the computed properties of one or more data assets. Moreover, each storage unit in the storage subsystem 108 may include one or more non-volatile storage or memory media including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Predictive Data Analysis Computing Entity

FIG. 2 provides a schematic of a predictive data analysis computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the predictive data analysis computing entity 106 may include, or be in communication with, one or more processing elements 205 (also referred to as processors, processing circuitry, and/or similar terms used herein interchangeably) that communicate with other elements within the predictive data analysis computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the predictive data analysis computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the predictive data analysis computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the predictive data analysis computing entity 106 with the assistance of the processing element 205 and operating system.

As indicated, in one embodiment, the predictive data analysis computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the predictive data analysis computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1x (1xRTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the predictive data analysis computing entity 106 may include, or be in communication with, one or more input elements, such as a keyboard input, a mouse input, a touch screen/display input, motion input, movement input, audio input, pointing device input, joystick input, keypad input, and/or the like. The predictive data analysis computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the predictive data analysis computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the predictive data analysis computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal-Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the predictive data analysis computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the predictive data analysis computing entity 106 and/or various other computing entities.

In another embodiment, the client computing entity 102 may include one or more components or functionality that are the same or similar to those of the predictive data analysis computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present invention improve the efficiency and reliability of performing generating explanatory data for dental image data objects based at least in part on historical data associated with individual identifiers associated with the noted dental image data objects. For example, various embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model. By using the noted techniques, various embodiments of the present invention enable automated captioning of dental image data objects, a feature that reduces the need for using dental image maintenance systems to generate manual captions for dental image data objects. In this way, various embodiments of the present invention improve efficiency of and reduce the overall operational load on dental image maintenance systems.

An exemplary application of various embodiments of the present invention relates to generating captions for x-ray images, including automatically generating a diagnosis caption for a dental x-ray image of a patient based at least in part on diagnosis codes derived from the dental x-ray image and an electronic health record of the patient. Aspects of various embodiments of the present invention generate the diagnosis caption at a word level in a sequential manner. A key benefit of these concepts is the automatic captioning of dental x-ray images, thereby reducing time and expenses spent manually captioning such images (as done in current methods by clinical professionals). These techniques are also advantageous in being flexible in implementation, where individual subsystems that perform individual operations or functions may be interchangeable with other subsystems. For example, a subsystem configured to determine Current Dental Terminology (CDT) diagnosis codes may be replaced with another subsystem configured to determine International Classification of Diseases (ICD) diagnosis codes.

FIG. 4 is a data flow diagram of an example process 400 for generating a historically dynamic explanation data object for a dental image data object that is associated with an individual identifier. Via the various steps/operations of the process 400, the predictive data analysis computing entity 106 can utilize a trained encoder-decoder machine learning framework in order to generate explanatory data for dental image data objects based at least in part on both image-based inferences performed in accordance with the dental image data objects and non-image-based (e.g., natural language processing) inferences performed in accordance with historical data associated with the noted dental image data objects.

The process 400 begins when an encoder machine learning framework 401 processes the dental image data object 411 and historical data 412 associated with the individual identifier in order to generate a dental image embedding 413. In some embodiments, the encoder machine learning framework comprises a current diagnosis identification machine learning model, a historical diagnosis identification machine learning model, a convolutional embedding machine learning model, a tooth identification embedding machine learning model, a new diagnosis code identification machine learning model, and a feature vector combination machine learning model, as further described below.

In some embodiments, the encoder machine learning framework 401 is configured to process a dental image data object and historical data associated with an individual Identifier for the dental image data object to generate a dental image embedding for the dental image data object. In some embodiments, the encoder machine learning framework 401 comprises: (i) a convolutional embedding machine learning model that is configured to process the dental image data object to generate a convolutional embedding vector for the dental image data object, (ii) a tooth identification embedding machine learning model that is configured to process the dental image data object to identify one or more tooth-specific bounding box sub-images in the dental image data object as well as a tooth type identifier for each tooth-specific bounding box sub-image, (iii) a current diagnosis machine learning model that is configured to process the dental image data object and each tooth type identifier for a tooth-specific bounding box sub-image of the dental image data object to generate a current diagnosis code vector for the dental image data object, (iv) a historical diagnosis code identification machine learning model that is configured to process the historical data to generate a historical diagnosis vector for the dental image data object, (v) a new diagnosis code identification machine learning model that is configured to process the current diagnosis code vector and the historical diagnosis code vector to generate a new diagnosis code vector for the dental image data object, and (vi) a feature vector combination machine learning model that is configured to generate the dental image embedding for the dental image data object based at least in part on the convolutional embedding vector, the tooth identification vector, the current diagnosis code vector, the historical diagnosis code.

In some embodiments, the dental image data object 411 describes an image that depicts at least one tooth associated with a particular individual, where an individual identifier of the particular individual that uniquely identifies the particular individual is associated with the dental image data object 411. In some embodiments, the dental image data object 411 describes an x-ray image of the interior of an individual's mouth. In some embodiments, the dental image data object 411 may comprise a set of bounding tooth-specific box sub-images each corresponding to a defined region of the dental image data object 411, where each bounding tooth-specific box sub-image depicts a tooth whose image is captured by the dental image data object 411. In some embodiments, prior to being processed by an encoder machine learning framework 401, the dental image data object 411 is preprocessed in accordance with one or more defined preprocessing operations (e.g., the dental image data object 411 is resized to a default size and/or padded).

In some embodiments, the historical data 412 describes a diagnostic history of the individual identifier and/or a demographic profile of the individual identifier. In some embodiments, the historical data 412 include a structured subset (e.g., structured electronic health record (EHR) data) that describe one or more diagnosis codes of the individual identifier in a structured way. In some embodiments, the historical data 412 include an unstructured subset (e.g., unstructured electronic health record (EHR) data including medical notes data) that describe diagnostic history of the individual identifier in an unstructured way. In some embodiments, the structured subset of the historical data 412 can be used to generate one or more structured diagnosis codes for the individual identifier. In some embodiments, the unstructured subset of the historical data 412 can be used to generate one or more unstructured diagnosis codes for the individual identifier.

In some embodiments, the dental image embedding 413 describes a fixed-size representation of the dental image data object 411 and the historical data 412 that is generated by the encoder machine learning framework 401. In some embodiments, determining the dental image embedding 413 comprises: determining, based at least in part on the dental image data object 411 and one or more tooth-specific bounding box sub-images of the dental image data object 411 and by using a current diagnosis identification machine learning model, a current diagnosis code vector for the dental image data object; determining, based at least in part on historical data associated with the individual identifier and by using a historical diagnosis identification machine learning model, a historical diagnosis code vector for the dental image data object 411; determining, based at least in part on the current diagnosis code vector and the historical diagnosis code vector, a new diagnosis code vector for the dental image data object 411; and determining, based at least in part on the new diagnosis vector for the dental image data object, a dental image embedding for the dental image data object 411.

In some embodiments, the encoder machine learning framework 401 has the architecture that is depicted in FIG. 5. As depicted in FIG. 5, the encoder machine learning framework 401 comprises: (i) a convolutional embedding machine learning model 501, (ii) a tooth identification embedding machine learning model 502, (iii) a current diagnosis code identification machine learning model 503, (iv) a historical diagnosis code identification machine learning model 504, (v) a new diagnosis code identification machine learning model 505, and (iv) a feature vector combination machine learning model 506.

As depicted in FIG. 5, the convolutional embedding machine learning model 501 is configured to process the dental image data object 411 using a set of convolutional operations in order to generate a convolutional embedding vector for the dental image data object 411. In some embodiments, the convolutional embedding machine learning model 501 is configured to: (i) process the dental image data object 411 using a set of convolutional and pooling operations (e.g., using any convolutional neural network feature extractor) to generate a final convolutional feature map, and (ii) performing one or more flattening operations on the final convolutional feature map to generate the convolutional embedding vector. In some embodiments, the inputs to the convolutional embedding machine learning model 501 comprise a matrix describing a dental image data object 411. In some embodiments, outputs of the convolutional embedding machine learning model 501 comprise the convolutional embedding vector.

An operational example of a convolutional embedding machine learning model 501 is depicted in FIG. 6. As depicted in FIG. 6, the convolutional embedding machine learning model 501 comprises a convolutional and pooling layer 601 that is configured to process the dental image data object 411 to generate a final convolutional feature map, as well as a fully connected layer 602 that is configured to process the final convolutional feature map to generate the convolutional embedding vector 611 for the dental image data object 411.

As further depicted in FIG. 5, the tooth identification embedding machine learning model 502 is configured to process the dental image data object 411 in order to generate a tooth identification vector that describes one or more tooth-specific bounding box sub-images of the dental image data object 411. In some embodiments, the tooth identification vector describes, for each tooth-specific bounding box sub-image of the dental image data object 411, a tooth type identifier for the tooth-specific bounding box sub-image. In some embodiments, the tooth identification embedding machine learning model 502 is configured to: (i) process the dental image data object 411 using a set of resizing and padding operations to generate a resized dental image data object, and (ii) process the resized dental image data object using a set of image localization operations to generate a tooth identification vector. In some embodiments, the tooth identification embedding machine learning model 502 is trained using training data describing, for each training dental image data object, a set of ground-truth tooth-specific bounding box sub-images and a ground-truth tooth type identifier for each ground-truth tooth-specific bounding box sub-image. In some embodiments, the inputs to the tooth identification embedding machine learning model 502 comprise a matrix describing a dental image data object. In some embodiments, outputs of the tooth identification embedding machine learning model 502 comprise the tooth identification vector. In some embodiments, the tooth identification vector is provided as an input to the current diagnosis code identification machine learning model.

An operational example of a tooth identification embedding machine learning model 502 is depicted in FIG. 7. As depicted in FIG. 7, the tooth identification embedding machine learning model 502 comprises a resizing/padding layer 701 that is configured to process the dental image data object 411 to generate a resized dental image data object and a locational model layer 702 that is configured to process the resized dental image data object to generate the tooth identification vector 711 for the dental image data object 411.

As further depicted in FIG. 5, the current diagnosis code identification machine learning model 503 is configured to process the dental image data object 411 in order to generate a current diagnosis code vector a set of inferred diagnosis codes determined based at least in part on the dental image data object 411 and/or based at least in part on tooth-specific bounding box sub-images of the dental image data object 411. In some embodiments, the current diagnosis code identification machine learning model 503 comprises at least one of the following: (i) a holistic image processing sub-model of the current diagnosis identification machine learning model that is configured to process the dental image data object 411 as a whole in order to generate a holistic current diagnosis code vector for the dental image data object 411 that describes a set of inferred diagnosis codes that are determined based at least in part on the dental image data object 411 as a whole; and (ii) a set of partial image processing sub-models of the current diagnosis identification machine learning model, where each partial image processing sub-model is configured to process a tooth-specific bounding box sub-image having a corresponding tooth type identifier that is associated with the tooth-specific bounding box sub-image in order to generate a tooth-specific current diagnosis code vector for the dental image data object with respect to the tooth-specific bounding box sub-image that describes a set of diagnosis codes that are inferred based at least in part on the noted tooth-specific current diagnosis code vector. In some embodiments, the current diagnosis code identification machine learning model is configured to combine (e.g., append, add up followed by removing duplicates, and/or the like) the holistic current diagnosis code vector and the set of tooth-specific current diagnosis code vectors generated by the set of partial image processing sub-models in order to generate the current diagnosis code vector. In some embodiments, the current diagnosis code vector is configured to describe a set of diagnosis code vectors for a dental image data object based at least in part on the dental image data object and/or based at least in part on tooth-specific bounding box sub-images of the dental image data object. In some embodiments, the inputs to the current diagnosis code identification machine learning model 503 comprise at least one of the following: (i) a matrix describing a dental image data object, or (ii) for each tooth-specific bounding box sub-image, a vector describing location of the tooth-specific bounding box sub-image within the dental image data object and/or a tooth type identifier of the tooth-specific bounding box sub-image. In some embodiments, outputs of the current diagnosis code identification machine learning model 503 comprise a vector describing the current diagnosis code vector. In some embodiments, each diagnosis code described by the current diagnosis code vector is associated with a confidence value describing a relative degree of confidence in applicability of the diagnosis code.

An operational example of a current diagnosis code identification machine learning model 503 is depicted in FIG. 8. As depicted in FIG. 8, the current diagnosis code identification machine learning model 503 comprises a holistic image processing sub-model 801, a set of partial image processing sub-models including the partial image processing sub-model 802A, and a current diagnosis code vector generation sub-model 803. As further depicted in FIG. 8, the holistic image processing sub-model 801 comprises a resizing/padding layer 821 that is configured to process the dental image data object 411 to generate a resized dental image data object and a diagnosis code generation layer 822 that is configured to process the resized dental image data object to generate a holistic current diagnosis code vector 811. As further depicted in FIG. 8, the partial image processing sub-model 802A comprises a cropping layer 831 that is configured to generate a particular tooth-specific bounding box sub-image using a bounding box defined by the tooth identification vector 711, a resizing/padding layer 832 that is configured to perform resizing/padding operations on the particular tooth-specific bounding box sub-image to generate a resized tooth-specific bounding box sub-image, and a diagnosis code generation layer 833 that is configured to process the resized-specific bounding box sub-image to generate a tooth-specific current diagnosis code vector 812. As further depicted in FIG. 8, the current diagnosis code vector generation sub-model 803 is configured to combine the holistic current diagnosis code vector 811 and the tooth-specific current diagnosis code vectors including the tooth-specific current diagnosis code vector 812 to generate the current diagnosis code vector 813.

As further depicted in FIG. 5, the historical diagnosis code identification machine learning model 504 is configured to process the historical data 412 associated with the individual identifier that is associated with the dental image data object in order to generate a historical diagnosis code vector for the dental image data object that describes a set of diagnosis codes inferred based at least in part on the noted historical data. In some embodiments, the historical diagnosis code identification machine learning model 504 comprises: (i) a structured data processing sub-model that is configured to extract a set of structured diagnosis codes for the individual identifier based at least in part on a structured subset of the historical data, and (ii) an unstructured data processing sub-model (e.g., a natural language processing machine learning model) that is configured to process an unstructured subset of the historical data to generate a set of unstructured diagnosis codes for the individual identifier. In some of the noted embodiments, the historical diagnosis code vector is generated based at least in part on at least one of the set of structured diagnosis codes and the set of unstructured diagnosis codes. In some embodiments, the unstructured data processing sub-model comprises a bidirectional text data encoder that uses a multi-headed attention machine mechanism and a classification model, where the bidirectional text data encoder is configured to generate a text embedding for the unstructured subset and the classification model is configured to extract the set of unstructured diagnosis codes based at least in part on the text embedding. In some embodiments, inputs to the historical diagnosis code identification machine learning model 504 comprise vectors describing structured historical data and vectors describing unstructured historical data. In some embodiments, outputs of the historical diagnosis code identification machine learning model 504 comprise a vector describing the historical diagnosis code vector. In some embodiments, each diagnosis code described by the historical diagnosis code vector is associated with a confidence value describing a relative degree of confidence in applicability of the diagnosis code.

As further depicted in FIG. 5, the new diagnosis code identification machine learning model 505 is configured to process a current diagnosis code vector for the dental image data object that is associated with the individual identifier and a historical diagnosis code vector for the individual identifier in order to generate a new diagnosis code vector for the dental image data object, where the new diagnosis code vector may be configured to describe a set of diagnosis codes that are described by the dental image data object independent of the historical data associated with the individual identifier. In some embodiments, the new diagnosis code vector is determined based at least in part on an output of a subtraction operation performed across the current diagnosis code vector and the historical diagnosis code vector (e.g., by removing those diagnosis codes described by the historical diagnosis code vector from the current diagnosis code vector). In some embodiments, the new diagnosis code identification machine learning model 505 is a machine learning model that is configured to process features extracted from the current diagnosis vector and features extracted from the historical diagnosis code vector using a set of trained parameters in order to generate the new diagnosis code vector. In some embodiments, inputs to the new diagnosis code identification machine learning model 505 comprise two vectors, one corresponding to the current diagnosis code vector and one corresponding to the historical diagnosis code vector. In some embodiments, outputs of the new diagnosis code identification machine learning model 505 comprise a vector corresponding to the new diagnosis code vector.

As further depicted in FIG. 5, the feature vector combination machine learning model 506 is configured to generate the dental image embedding 413 for the dental image data object associated with the individual identifier based at least in part on a set of input vectors associated with the dental image data object and/or with the individual identifier. In some embodiments, the set of input vectors comprise at least one (e.g., all) of the following vectors: a convolutional embedding vector for the dental image data object, a tooth identification vector for the dental image data object, a current diagnosis code vector for the dental image data object, a historical diagnosis code vector for the dental image data object, a new diagnosis code vector for the dental image data object, and a demographic data vector 511 for the individual identifier (e.g., a demographic data vector describing one or more demographic features of the individual identifier, such as at least one of age of the individual identifier, gender of the individual identifier, location of the individual identifier, and/or the like). In some embodiments, the feature vector combination machine learning model 506 is configured to append set of input vectors to generate the historically dynamic explanation data object. In some embodiments, the feature vector combination machine learning model 506 is configured to perform a defined vector operation across the set of input vectors to generate the historically dynamic explanation data object. In some embodiments, the feature vector combination machine learning model 506 is configured to process features extracted based at least in part on the set of input vectors in accordance with a set of trained parameters to generate the historically dynamic explanation data object. In some embodiments, inputs to the feature vector combination machine learning model 506 comprise a set of vectors corresponding to the set of input vectors. In some embodiments, outputs of the feature vector combination machine learning model 506 comprise a vector corresponding to the dental image embedding.

Returning to FIG. 4, the process 400 continues when a decoder machine learning framework 402 processes the dental image embedding 413 to generate the historically dynamic explanation data object 414. In some embodiments, the dental image embedding 413 is processed using a recurrent neural network machine learning model to generate the historically dynamic explanation data object 414. In some embodiments, the decoder machine learning framework 402 configured to process a dental image embedding for a dental image data object to generate a historically dynamic explanation data object for the dental image data object. In some embodiments, the decoder machine learning framework 402 comprises a recurrent neural network machine learning model, for example a recurrent neural network machine learning model that is configured to process a segment (e.g., a single value) of the dental image embedding at each time step and that is configured to generate the historically dynamic explanation data object based at least in part on each timestep output for each time step of the recurrent neural network machine learning model.

The historically dynamic explanation data object can be used to generate captions for dental image data objects. In doing so, various embodiments of the present invention improve the efficiency and reliability of performing generating explanatory data for dental image data objects based at least in part on historical data associated with individual identifiers associated with the noted dental image data objects. For example, various embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model. By using the noted techniques, various embodiments of the present invention enable automated captioning of dental image data objects, a feature that reduces the need for using dental image maintenance systems to generate manual captions for dental image data objects. In this way, various embodiments of the present invention improve efficiency of and reduce the overall operational load on dental image maintenance systems.

In some embodiments, the decoder machine learning framework 402 is trained in combination with the encoder machine learning framework. For example, in some embodiments, during each training iteration: (i) an input dental image data object for a particular individual identifier and historical data for the particular individual identifier are provided as an input to the encoder machine learning framework in order to generate a particular dental image embedding for the input dental image data object, (ii) the particular dental image embedding is processed by the decoder machine learning framework to generate an inferred historically dynamic explanation data object for the input dental image data object, and (iii) trainable parameters of the encoder machine learning framework and trainable parameters of the decoder machine learning framework are updated in a manner that is configured to (e.g., locally or globally) optimize a measure of deviation of the inferred historically dynamic explanation data object and a ground-truth historically dynamic explanation data object for the input dental image data object. As another example, in some embodiments, during a set of training iterations: (i) a set of input dental image data objects for a set of individual identifiers and historical data for the set of individual identifiers are provided as inputs to the encoder machine learning framework in order to generate a set of dental image embeddings for the input dental image data objects, (ii) the particular dental image embeddings are processed by the decoder machine learning framework to generate a set of inferred historically dynamic explanation data objects for the input dental image data objects, and (iii) trainable parameters of the encoder machine learning framework and trainable parameters of the decoder machine learning framework are updated in a manner that is configured to (e.g., locally or globally) optimize a measure of deviation of the inferred historically dynamic explanation data objects and ground-truth historically dynamic explanation data objects for the input dental image data objects.

An operational example of a decoder machine learning framework 402 is depicted in FIG. 9. As depicted in FIG. 9, the decoder machine learning framework 402 comprises a recurrent neural network that is configured to process the dental image embedding 413 during a set of recurrent neural network timesteps in order to generate the historically dynamic explanation data object 414 for the dental image data object 411.

Once generated, the historically dynamic explanation data object 414 can be used to perform one or more prediction-based actions. In some embodiments, to perform the prediction-based actions, the predictive data analysis computing entity 106 transmits the historically dynamic explanation data object 414 to a client computing entity 102, where the client computing entity 102 is configured to perform one or more configured actions based at least in part on the historically dynamic explanation data object 414. Examples of configured actions include automated appointment scheduling, automated drug prescription generation, automated load balancing operations, and/or the like.

In some embodiments, to perform the prediction-based actions, the predictive data analysis computing entity 106 generates user interface data for a prediction output user interface that displays the historically dynamic explanation data object 414. An operational example of such a prediction output user interface 1000 is depicted in FIG. 10. As depicted in FIG. 10, the prediction output user interface displays the historically dynamic explanation data object 414 using the user interface element 1002 after the uses selects a dental image data object using the user interface element 1001.

In some embodiments, subsequent to generating the user interface data, the predictive data analysis computing entity 106 uses the user interface data to display the prediction output user interface on a display device of the predictive data analysis computing entity 106. In some embodiments, subsequent to generating the user interface data, the predictive data analysis computing entity 106 transmits the user interface data to a client computing entity 102, where the client computing entity 102 is configured to generate and present a prediction output user interface based at least in part on the user interface data that is received from the predictive data analysis computing entity 106.

Thus, as described above, various embodiments of the present invention improve the efficiency and reliability of performing generating explanatory data for dental image data objects based at least in part on historical data associated with individual identifiers associated with the noted dental image data objects. For example, various embodiments of the present invention utilize systems, methods, and computer program products that perform generating a historically dynamic explanation data object for a dental image data object using an encoder-decoder architecture, where the encoder machine learning framework of the encoder-decoder architecture comprises a current diagnosis identification machine learning model, a historical diagnosis identification machine learning model, a convolutional embedding machine learning model, a new diagnosis code inference machine learning model, and a feature vector combination machine learning model. By using the noted techniques, various embodiments of the present invention enable automated captioning of dental image data objects, a feature that reduces the need for using dental image maintenance systems to generate manual captions for dental image data objects. In this way, various embodiments of the present invention improve efficiency of and reduce the overall operational load on dental image maintenance systems.

VI. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:
1. A computer-implemented method comprising:
generating, by one or more processors, a convolutional embedding vector of a dental image and one or more tooth-specific bounding box sub-images of the dental image;
generating, by the one or more processors, based at least in part on the dental image and the one or more tooth-specific bounding box sub-images of the dental image, and by using an encoder machine learning framework, a current diagnosis code vector for the dental image;
generating, by the one or more processors, based at least in part on historical data associated with an individual identifier associated with the dental image, and by using the encoder machine learning framework, a historical diagnosis code vector for the dental image;
generating, by the one or more processors, using the encoder machine learning framework, and based at least in part on the historical diagnosis code vector and the current diagnosis code vector, a new diagnosis code vector for the dental image configured to describe a set of diagnosis codes depicted by the dental image independent of the historical data associated with the individual identifier;
generating, by the one or more processors and based at least in part on the convolutional embedding vector and the new diagnosis code vector for the dental image, a dental image embedding for the dental image;
generating, by the one or more processors, based at least in part on the dental image embedding, and by using a decoder machine learning framework, a dynamic explanation data object, wherein the decoder machine learning framework and the encoder machine learning framework are trained, in combination, based at least in part on a measure of deviation of the dynamic explanation data object and a ground-truth data object for the dental image;

generating, by the one or more processors and based at least in part on the dynamic explanation data object, an automated caption for the dental image; and generating, by the one or more processors, user interface data for a prediction output user interface that is configured to display the automated caption and the dental image.

2. The computer-implemented method of claim 1, wherein generating the current diagnosis code vector comprises:

determining, based at least in part on the dental image and by using a holistic image processing sub-layer of the encoder machine learning framework, a holistic current diagnosis code vector for the dental image;

generating, based at least in part on the one or more tooth-specific bounding box sub-images and by using a partial image processing sub-layer of the encoder machine learning framework that is associated with a tooth type identifier of the one or more tooth-specific bounding box sub-images, a tooth-specific current diagnosis code vector for the dental image; and generating the current diagnosis code vector based at least in part on the holistic current diagnosis code vector and the tooth-specific current diagnosis code vector.

3. The computer-implemented method of claim 1, wherein generating the historical diagnosis code vector comprises:

determining, based at least in part on a structured subset of the historical data, one or more structured diagnosis codes for the individual identifier;

generating, based at least in part on an unstructured subset of the historical data and by using an unstructured data processing sub-layer of the encoder machine learning framework, one or more unstructured diagnosis codes for the individual identifier; and generating the historical diagnosis code vector based at least in part on the one or more structured diagnosis codes and the one or more unstructured diagnosis codes.

4. The computer-implemented method of claim 1, wherein generating the dental image embedding comprises:

determining, based at least in part on the dental image and by using a convolutional embedding layer of the encoder machine learning framework, a convolutional embedding vector for the dental image;

determining, based at least in part on the dental image and by using a tooth identification embedding layer of the encoder machine learning framework, a tooth identification vector for the dental image that describes a tooth type identifier for each tooth-specific bounding box sub-image of the one or more tooth-specific bounding box sub-images; and generating the dental image embedding based at least in part on the convolutional embedding vector, the tooth identification vector, the current diagnosis code vector, the historical diagnosis code vector, the new diagnosis code vector, and a demographic data vector for the individual identifier.

5. The computer-implemented method of claim 1, wherein the decoder machine learning framework comprises a recurrent neural network machine learning model.

6. The computer-implemented method of claim 1, wherein the encoder machine learning framework comprises a current diagnosis identification machine learning model, a historical diagnosis identification machine learning model, a convolutional embedding machine learning model, a new diagnosis code inference machine learning model, and a feature vector combination machine learning model.

7. The computer-implemented method of claim 1, wherein the new diagnosis code vector is determined based at least in part on a difference between the current diagnosis code vector and the historical diagnosis code vector.

8. A system comprising:

one or more processors; and one or more memories storing processor-executable instructions that, when executed by any one or more of the one or more processors, cause the one or more processors to perform operations comprising:

generating a convolutional embedding vector of a dental image and one or more tooth-specific bounding box sub-images of the dental image;

generating, based at least in part on the dental image and the one or more tooth-specific bounding box sub-images of the dental image, and by using an encoder machine learning framework, a current diagnosis code vector for the dental image;

generating, based at least in part on historical data associated with an individual identifier associated with the dental image, and by using the encoder machine learning framework, a historical diagnosis code vector for the dental image;

generating, using the encoder machine learning framework, and based at least in part on the historical diagnosis code vector and the current diagnosis code vector, a new diagnosis code vector for the dental image configured to describe a set of diagnosis codes depicted by the dental image independent of the historical data associated with the individual identifier;

generating, based at least in part on the convolutional embedding vector and the new diagnosis code vector for the dental image, a dental image embedding for the dental image;

generating, based at least in part on the dental image embedding, and by using a decoder machine learning framework, a dynamic explanation data object, wherein the decoder machine learning framework and the encoder machine learning framework are trained, in combination, based at least in part on a measure of deviation of the dynamic explanation data object and a ground-truth data object for the dental image;

generating, based at least in part on the dynamic explanation data object, an automated caption for the dental image; and generating user interface data for a prediction output user interface that is configured to display the automated caption and the dental image.

9. The system of claim 8, wherein generating the current diagnosis code vector comprises:

determining, based at least in part on the dental image and by using a holistic image processing sub-layer of the encoder machine learning framework, a holistic current diagnosis code vector for the dental image;

generating, based at least in part on the one or more tooth-specific bounding box sub-images and by using a partial image processing sub-layer of the encoder machine learning framework that is associated with a tooth type identifier of the one or more tooth-specific bounding box sub-images, a tooth-specific current diagnosis code vector for the dental image; and generating the current diagnosis code vector based at least in part on the holistic current diagnosis code vector and the tooth-specific current diagnosis code vector.

10. The system of claim 8, wherein generating the historical diagnosis code vector comprises:
   determining, based at least in part on a structured subset of the historical data, one or more structured diagnosis codes for the individual identifier;
   determining, based at least in part on an unstructured subset of the historical data and by using an unstructured data processing sub-layer of the encoder machine learning framework, one or more unstructured diagnosis codes for the individual identifier; and
   generating the historical diagnosis code vector based at least in part on the one or more structured diagnosis codes and the one or more unstructured diagnosis codes.

11. The system of claim 8, wherein generating the dental image embedding comprises:
   determining, based at least in part on the dental image and by using a convolutional embedding layer of the encoder machine learning framework, a convolutional embedding vector for the dental image;
   determining, based at least in part on the dental image and by using a tooth identification embedding layer of the encoder machine learning framework, a tooth identification vector for the dental image that describes a tooth type identifier for each tooth-specific bounding box sub-image of the one or more tooth-specific bounding box sub-images; and
   generating the dental image embedding based at least in part on the convolutional embedding vector, the tooth identification vector, the current diagnosis code vector, the historical diagnosis code vector, the new diagnosis code vector, and a demographic data vector for the individual identifier.

12. The system of claim 8, wherein the decoder machine learning framework comprises a recurrent neural network machine learning model.

13. The system of claim 8, wherein the encoder machine learning framework comprises a current diagnosis identification machine learning model, a historical diagnosis identification machine learning model, a convolutional embedding machine learning model, a new diagnosis code inference machine learning model, and a feature vector combination machine learning model.

14. The system of claim 8, wherein the new diagnosis code vector is determined based at least in part on a difference between the current diagnosis code vector and the historical diagnosis code vector.

15. One or more non-transitory computer-readable storage media storing instructions that, when executed by one or more processors, cause the one or more processors to perform operations comprising:
   generating a convolutional embedding vector of a dental image and one or more tooth-specific bounding box sub-images of the dental image;
   generating, based at least in part on the dental image and the one or more tooth-specific bounding box sub-images of the dental image, and by using an encoder machine learning framework, a current diagnosis code vector for the dental image;
   generating, based at least in part on historical data associated with an individual identifier associated with the dental image, and by using the encoder machine learning framework, a historical diagnosis code vector for the dental image;
   generating, using the encoder machine learning framework, and based at least in part on the historical diagnosis code vector and the current diagnosis code vector, a new diagnosis code vector for the dental image configured to describe a set of diagnosis codes depicted by the dental image independent of the historical data associated with the individual identifier;
   generating, based at least in part on the convolutional embedding vector and the new diagnosis code vector for the dental image, a dental image embedding for the dental image;
   generating, based at least in part on the dental image embedding, and by using a decoder machine learning framework, a dynamic explanation data object, wherein the decoder machine learning framework and the encoder machine learning framework are trained, in combination, based at least in part on a measure of deviation of the dynamic explanation data object and a ground-truth data object for the dental image;
   generating, based at least in part on the dynamic explanation data object, an automated caption for the dental image; and
   generating user interface data for a prediction output user interface that is configured to display the automated caption and the dental image.

16. The one or more non-transitory computer-readable storage media of claim 15, wherein generating the current diagnosis code vector comprises:
   determining, based at least in part on the dental image and by using a holistic image processing sub-layer of the encoder machine learning framework, a holistic current diagnosis code vector for the dental image;
   generating, based at least in part on the one or more tooth-specific bounding box sub-images and by using a partial image processing sub-layer of the encoder machine learning framework that is associated with a tooth type identifier of the one or more tooth-specific bounding box sub-images, a tooth-specific current diagnosis code vector for the dental image; and
   generating the current diagnosis code vector based at least in part on the holistic current diagnosis code vector and the tooth-specific current diagnosis code vector.

17. The one or more non-transitory computer-readable storage media of claim 15, wherein generating the historical diagnosis code vector comprises:
   determining, based at least in part on a structured subset of the historical data, one or more structured diagnosis codes for the individual identifier;
   determining, based at least in part on an unstructured subset of the historical data and by using an unstructured data processing sub-layer of the encoder machine learning framework, one or more unstructured diagnosis codes for the individual identifier; and
   generating the historical diagnosis code vector based at least in part on the one or more structured diagnosis codes and the one or more unstructured diagnosis codes.

18. The one or more non-transitory computer-readable storage media of claim 15, wherein generating the dental image embedding comprises:
   determining, based at least in part on the dental image and by using a convolutional embedding layer of the encoder machine learning framework, a convolutional embedding vector for the dental image;
   determining, based at least in part on the dental image and by using a tooth identification embedding layer of the encoder machine learning framework, a tooth identification vector for the dental image that describes a tooth type identifier for each tooth-specific bounding box sub-image of the one or more tooth-specific bounding box sub-images; and generating the dental image embedding based at least in part on the convolutional embedding vector, the tooth identification vector, the current diagnosis code vector, the historical diagnosis code vector, the new diagnosis code vector, and a demographic data vector for the individual identifier.

19. The one or more non-transitory computer-readable storage media of claim 15, wherein the decoder machine learning framework comprises a recurrent neural network machine learning model.

20. The one or more non-transitory computer-readable storage media of claim 15, wherein the encoder machine learning framework comprises a current diagnosis identification machine learning model, a historical diagnosis identification machine learning model, a convolutional embedding machine learning model, a new diagnosis code inference machine learning model, and a feature vector combination machine learning model.

* * * * *